(12) United States Patent
Wakuda

(10) Patent No.: US 8,615,598 B2
(45) Date of Patent: Dec. 24, 2013

(54) COMMUNICATION PROCESSING DEVICE, COMMUNICATION PROCESSING SYSTEM, COMMUNICATION PROCESSING METHOD AND PROGRAM

(75) Inventor: Kensaku Wakuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 13/152,775

(22) Filed: Jun. 3, 2011

(65) Prior Publication Data

US 2011/0307604 A1 Dec. 15, 2011

(30) Foreign Application Priority Data

Jun. 9, 2010 (JP) ................................ P2010-132322

(51) Int. Cl.
*G06F 5/06* (2006.01)
(52) U.S. Cl.
USPC ............................ 709/232; 709/231; 709/235
(58) Field of Classification Search
USPC ................... 709/224, 232, 235, 230, 223, 231
See application file for complete search history.

(56) References Cited

U.S. PATENT DOCUMENTS

| 5,953,506 A * | 9/1999 | Kalra et al. ................... 709/231 |
| 8,214,535 B2 * | 7/2012 | Hua et al. ...................... 709/250 |
| 2005/0201296 A1 * | 9/2005 | Vannithamby et al. ........ 370/241 |
| 2007/0115796 A1 * | 5/2007 | Jeong et al. .................... 370/203 |
| 2007/0230344 A1 * | 10/2007 | Hua et al. ...................... 370/235 |
| 2011/0191644 A1 * | 8/2011 | Oldfield et al. ................ 714/704 |

FOREIGN PATENT DOCUMENTS

| JP | 2002 204278 | 7/2002 |
| JP | 2004 297565 | 10/2004 |

* cited by examiner

*Primary Examiner* — Kenneth R Coulter
(74) *Attorney, Agent, or Firm* — Sony Corporation

(57) ABSTRACT

There is provided a communication processing device including a sender report transmitting unit which transmits to a client a sender report including transmission information of transmission data on a regular basis separately from a rate change report, an extended receiver report receiving unit which receives from the client an extended receiver report which includes the transmission information and which is transmitted from the client when the client receives the sender report, and a rate controlling unit which controls a transmission rate of transmission data for the client, based on the transmission information stored in a transmission information storing unit and the transmission information included in the extended receiver report received from the client.

12 Claims, 7 Drawing Sheets

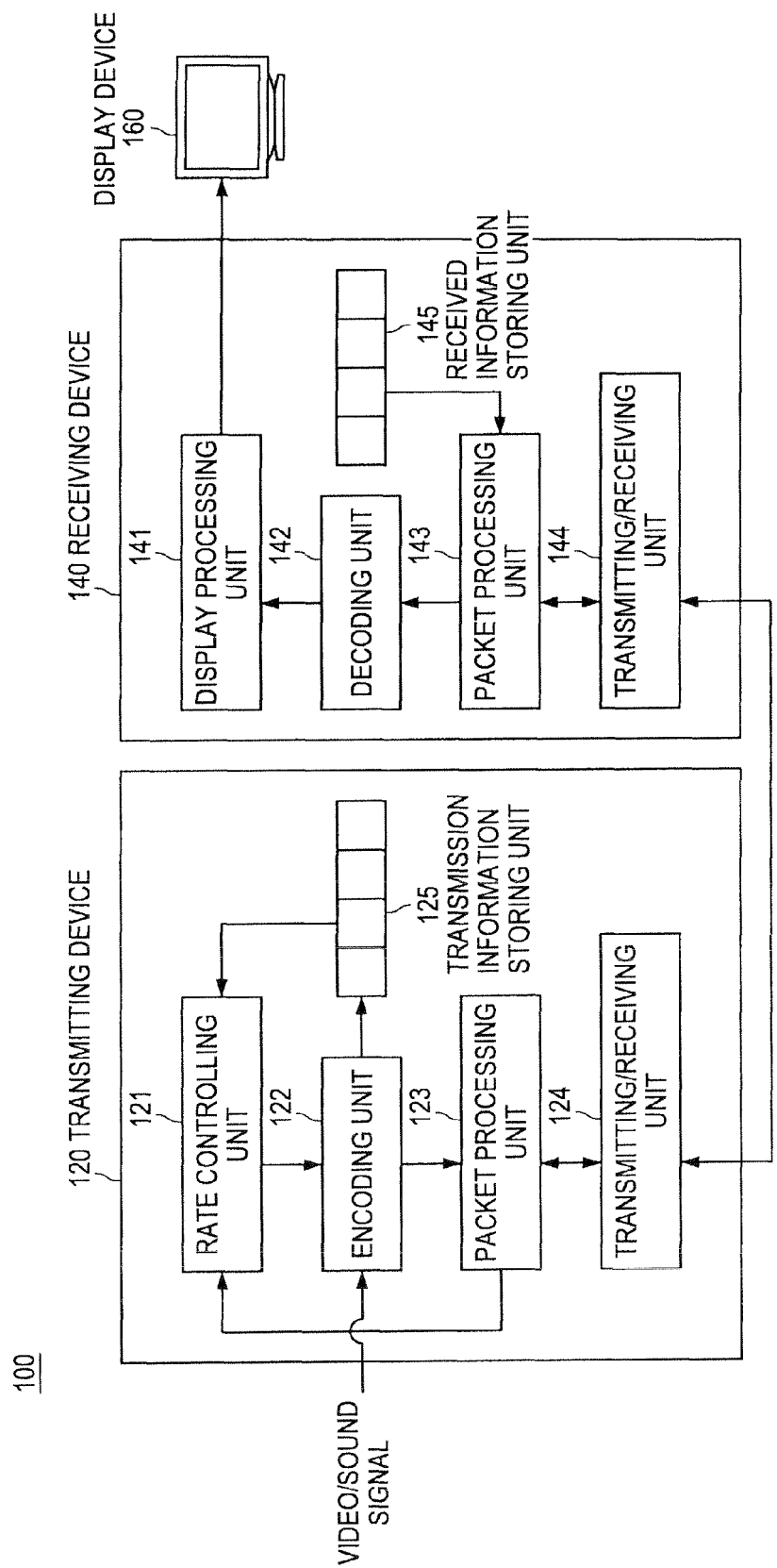

FIG.2

| V | P | RC | PT=204 | PACKET LENGTH | SSRC | APPLICATION DEFINING PACKET NAME = "EXRR" | SENDER REPORT TIME STAMP 1 | SENDER REPORT ELAPSED TIME 1 | NUMBER OF LOST PACKETS 1 | NUMBER OF RECEIVED PACKETS 1 | SENDER REPORT TIME STAMP 2 | SENDER REPORT ELAPSED TIME 2 | NUMBER OF LOST PACKETS 2 | NUMBER OF RECEIVED PACKETS 2 | ... | SENDER REPORT TIME STAMP n | SENDER REPORT ELAPSED TIME n | NUMBER OF LOST PACKETS n | NUMBER OF RECEIVED PACKETS n |

RTCP RR spans the entire structure.

COMMUNICATION PROCESSING DEVICE, COMMUNICATION PROCESSING SYSTEM, COMMUNICATION PROCESSING METHOD AND PROGRAM

BACKGROUND

The present disclosure relates to a communication processing device, a communication processing system, a communication processing method and a program.

In a streaming system which plays back video data or sound data while receiving them, RTP (Real-time Transport Protocol) is used for a communication protocol in many cases. RTP is the UDP (User Datagram Protocol) protocol which normally does not perform retransmission control (packet loss countermeasure or transmission delay time compensation) when packet loss occurs. Therefore, RTP is a protocol which does not cause time delay resulting from retransmission control, and which is suitable for playback in real time processing.

In communication to which RTP is applied, the rate is controlled using, for example, RTCP (RTP Control Protocol). RTCP is a protocol which controls sessions for transmitting and receiving data according to RTP.

Japanese Patent Application Laid-Open No. 2002-204278 discloses a technique where a receiving device reports a packet loss rate to a transmitting device, and the transmitting device estimates a transmitting state of a transmission path based on this report and changes a bit rate of transmission data.

Further, with the streaming system, it is necessary to transmit data at a stable transmission rate. Japanese Patent Application Laid-Open No. 2004-297565 discloses a technique where a transmitting device measures an uplink transmission rate and a receiving device measures a downlink transmission rate and determines a maximum value of the transmission rate based on the smaller rate of the two transmission rates.

SUMMARY

However, with the system of reporting a receiving state using RR (Receiver Report) packets of RTCP, when the transmission rate of a transmitting device is changed by a rate controlling unit, it is necessary to acquire an accurate reception rate matching the transmission rate in the past, and more precisely control the rate.

In light of the foregoing, it is desirable to provide a novel and improved communication processing device, communication processing system, communication processing method and program which acquire an accurate reception rate matching a transmission rate in the past and which can more precisely control the rate.

According to the present disclosure, there is provided a communication processing device including a rate change report transmitting unit which, when a transmission rate of transmission data for a client is changed, transmits to the client a rate change report including transmission information of the transmission data, a transmission information storing unit which, when the transmission rate is changed, stores the transmission information of the transmission data, a sender report transmitting unit which transmits to the client a sender report including transmission information of transmission data on a regular basis separately from the rate change report, an extended receiver report receiving unit which receives from the client an extended receiver report which includes the transmission information and which is transmitted from the client when the client receives the sender report, and a rate controlling unit which controls a transmission rate of transmission data for the client, based on the transmission information stored in the transmission information storing unit and the transmission information included in the extended receiver report received from the client.

The transmission information may include a transmission time and a transmission rate of the transmission data.

The transmission information storing unit may store a plurality of numbers of times the transmission information of the transmission data at a time when the transmission rate is changed. And the rate controlling unit may control the transmission rate by comparing the transmission information stored a plurality of numbers of times and the transmission information included in the extended receiver report received from the client.

According to the present disclosure, there is provided a communication processing system including a client including a sender report receiving unit which receives a sender report including transmission information of transmission data, and an extended receiver report transmitting unit which, when receiving the sender report, transmits an extended receiver report including the transmission information, and a communication processing device including a rate change report transmitting unit which, when a transmission rate of the transmission data for the client is changed, transmits to the client a rate change report including transmission information of the transmission data, separately from the sender report, a transmission information storing unit which, when the transmission rate is changed, stores the transmission information of the transmission data, a sender report transmitting unit which transmits the sender report to the client on a regular basis, an extended receiver report receiving unit which receives the extended receiver report from the client, and a rate controlling unit which controls a transmission rate of transmission data for the client, based on the transmission information stored in the transmission information storing unit and the transmission information included in the extended receiver report received from the client.

According to the present disclosure, there is provided a communication processing method including when a transmission rate of transmission data for a client is changed, transmitting to the client a rate change report including transmission information of the transmission data, when the transmission rate is changed, storing the transmission information of the transmission data in a transmission information storing unit, transmitting to the client a sender report including transmission information of transmission data on a regular basis separately from the rate change report, receiving from the client an extended receiver report which includes the transmission information and which is transmitted from the client when the client receives the sender report, and controlling a transmission rate of transmission data for the client, based on the transmission information stored in the transmission information storing unit and the transmission information included in the extended receiver report received from the client.

According to the present disclosure, there is provided a program causing a computer to execute when a transmission rate of transmission data for a client is changed, transmitting to the client a rate change report including transmission information of the transmission data, when the transmission rate is changed, storing the transmission information of the transmission data in a transmission information storing unit, transmitting to the client a sender report including transmission information of transmission data on a regular basis separately from the rate change report, receiving from the client an extended receiver report which includes the transmission information and which is transmitted from the client when the client receives the sender report, and controlling a transmission rate of transmission data for the client, based on the transmission information stored in the transmission information storing unit and the transmission information included in the extended receiver report received from the client.

According to the present disclosure as described above, it is possible to acquire an accurate reception rate matching a transmission rate in the past, and consequently more precisely control the rate.

BRIEF DESCRIPTION OF THE DRAWINGS

FIG. 1 is a block diagram showing a configuration of a data communication system 100 according to an embodiment of the present disclosure;

FIG. 2 is an explanatory diagram showing an example of a packet format of an extended receiver report;

DETAILED DESCRIPTION OF THE EMBODIMENT

Figure 3:
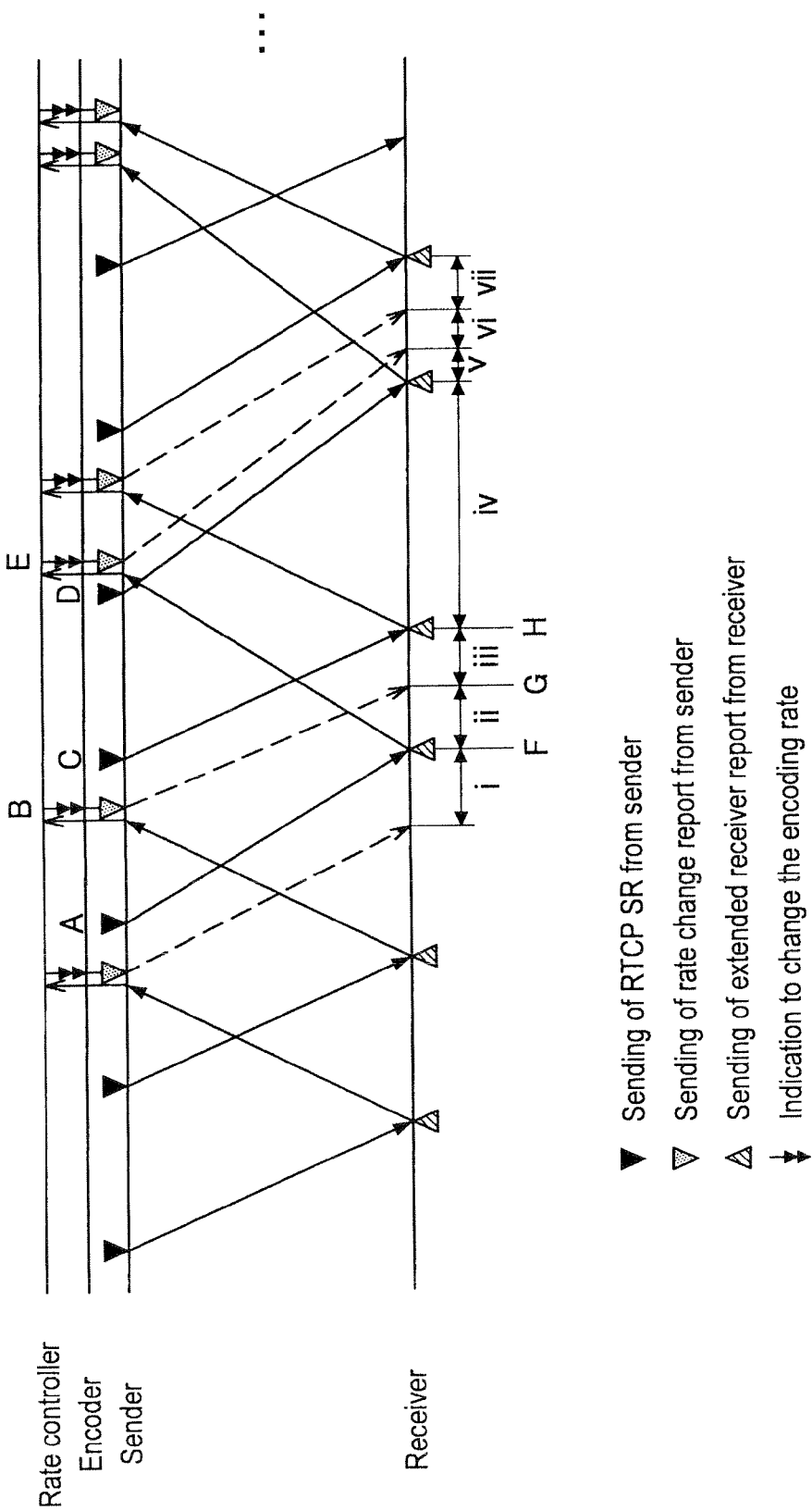
FIG. 3 is an explanatory diagram showing an example of a rate control flow according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. A configuration according to an embodiment
2. An operation according to an embodiment
1. A Configuration According to an Embodiment First, a configuration of a data communication system 100 according to an embodiment of the present disclosure will be explained with reference to FIG. 1. The data communication system 100 has a transmitting device 120 and a receiving device 140. The data communication system 100 according to the present embodiment can more precisely control a rate by associating a transmission rate and a reception rate.

The transmitting device 120 is, for example, a server device, and has a rate controlling unit 121, an encoding unit 122, a packet processing unit 123, a transmitting/receiving unit 124 and a transmission information storing unit 125.

The rate controlling unit 121 calculates a new transmission rate and changes the transmission rate. The rate controlling unit 121 reports the changed transmission rate to the encoding unit 122. When receiving an extended receiver report from the receiving device 140, the rate controlling unit 121 controls the rate by matching contents of the transmission information storing unit 125 and information of a received information storing unit 145 based on the extended receiver report.

The encoding unit 122 receives video signals and sound signals from monitoring cameras or video cameras. The encoding unit 122 encodes video data and sound data according to the rate set by the rate controlling unit 121.

The packet processing unit 123 packetizes encoded video data and sound data.

The transmitting/receiving unit 124 transmits and receives the packetized data to the receiving device 140 and from the receiving device 140. To change the transmission rate, the transmitting/receiving unit 124 transmits a "rate change report packet" to the receiving device 140. Further, the transmitting/receiving unit 124 transmits SR (Sender Report) packets of RTCP to the receiving device 140 on a regular basis at RTCP reporting intervals.

The transmission information storing unit 125 stores a transmission time stamp and transmission rate at the time when the "rate change report packet" is transmitted. The transmission information storing unit 125 stores the transmission time stamps and transmission rates for a certain number of times.

The receiving device 140 is, for example, a client-side terminal device, and has a display processing unit 141, a decoding unit 142, a packet processing unit 143, a transmitting/receiving unit 144 and the received information storing unit 145. The receiving device 140 is connected with a display device 160 to display video images of video data on the display device 160 or output sounds of sound data.

The display processing unit 141 generates a display signal for displaying video images on the display device 160 based on the video data, and transmits a display signal to the display device 160.

The decoding unit 142 decodes encoded video data and sound data. The decoding unit 142 transmits the decoded video data and sound data to the display processing unit 141.

The packet processing unit 143 reads packetized data received from the transmitting device 120, and restores lost packets.

The transmitting/receiving unit 124 transmits and receives the packetized data to the transmitting device 120 or from the transmitting device 120. When receiving an RTCP SR packet, the transmitting/receiving unit 124 transmits an "extended receiver report" to the transmitting device 120 based on contents stored in the received information storing unit 145.

When receiving the RTCP SR packet from the transmitting device 120, similar to the rate change report packet, the received information storing unit 145 stores (1) the transmission time stamp, (2) the time between the time when a previous rate change report packet or RTCP SR packet is received and the present time, (3) the number of received packets and (4) the number of loss packets. The received information storing unit 145 stores received information for a certain number of times.

2. An Operation According to an Embodiment

Next, the operation of the data communication system 100 according to the present embodiment will be explained.

With the configuration as shown in FIG. 1, the transmission information storing unit 125 is provided in the transmitting device 120 to store the transmitted transmission rate for a certain number of times. The received information storing unit 145 is provided in the receiving device 140 to store received information for a certain number of times. The operation will be explained below.

The rate controlling unit 121 of the transmitting device 120 calculates the transmission rate and changes the transmission rate. To change the transmission rate, the transmitting device 120 transmits "rate change report packet" to the receiving device 140. The rate change report packet includes the transmission time stamp indicating the transmission time and the changed transmission rate. To change the transmission rate, the transmitting device 120 may transmit a report only by adding a flag indicating the change of the transmission rate, to data which is RTP-packetized and transmitted, instead of the rate change report packet.

Then, the transmitting device 120 transmits the "rate change report packet" and, at the same time, stores the transmission time stamp and transmission rate in the transmission information storing unit 125. Further, the transmitting device 120 transmits an RTCP SR (Sender Report) packet to the receiving device 140 at RTCP reporting intervals.

When receiving the rate change report packet from the transmitting device 120, the receiving device 140 stores (1) the transmission time stamp, (2) the time between the time when a previous rate change report packet or RTCP SR packet is received and the present time, (3) the number of received packets and (4) the number of loss packets, in the received information storing unit 145. The number of received packets and the number of loss packets can be learned from a sequence number described in a packet.

When receiving the RTCP SR packet from the transmitting device 120, similar to the rate change report packet, the receiving device 140 stores (1) the transmission time stamp, (2) the time between the time when a previous rate change report packet or RTCP SR packet is received and the present time, (3) the number of received packets and (4) the number of loss packets, in the received information storing unit 145.

Then, immediately after receiving the RTCP SR packet, the receiving device 140 transmits the "extended receiver report" to the transmitting device 120 based on the contents stored in the received information storing unit 145, and deletes the contents of the received information storing unit 145. The extended receiver report includes the contents stored in the received information storing unit 145. The details of the extended receiver report will be explained below.

When receiving the extended receiver report from the receiving device 140, the transmitting device 120 controls the rate by matching the contents of the transmission information storing unit 125 and information of the received information storing unit 145 based on the extended receiver report. Information is matched based on the transmission time stamp.

The extended receiver report will be explained.

Although the extended receiver report may have any format, the extended receiver report needs to include contents equivalent to RTCP RR and all pieces of information of the received information storing unit 145, that is, (1) the transmission time stamp, (2) the time between the time when a previous rate change report packet or RTCP SR packet is received and the present time, (3) the number of received packets and (4) the number of loss packets.

Here, the extended receiver report is defined as RTCP APP, and is packed together with RTCP RR and is transmitted to the transmitting device 120 as the RTCP complex packet. RTCP APP is a protocol of RTCP which the user can extend. FIG. 2 shows an example of a packet format of the extended receiver report. A sender report time stamp in FIG. 2 represents a transmission time stamp indicating the transmission time of the rate change report packet, or a transmission time stamp indicating the transmission time of the RTCP SR packet. The head to an application defining packet name in FIG. 2 correspond to RR of RTCP. Using received information of the sender report time stamp to the number of loss packets in FIG. 2 as one unit, one piece of received information is generated per time between a previous rate change report packet or RTCP SR packet and the present time. The extended receiver report transmitted at, for example, point H of the flow shown in FIG. 3 includes received information of each of section ii and section iii.

FIG. 3 shows an example of the rate control flow according to an embodiment of the present disclosure. Here, although FIG. 3 does not show data transmission using RTP to prevent complication of drawings, data is transmitted at the set transmission rate from the transmitting device 120 to the receiving device 140.

At, for example, point B, when the transmitting device 120 receives the extended receiver report, the rate controlling unit 121 calculates the rate and reports the calculated rate to the encoding unit 122. At the same time, the transmitting device 120 transmits the rate change report packet to the receiving device 140. Further, the transmitting device 120 stores the transmission time stamp and transmission rate in the transmission information storing unit 125.

With the example of FIG. 3, the rate change report packet transmitted from the transmitting device 120 at point B is received by the receiving device 140 at point G. Then, the receiving device 140 stores the time measured in the time (section ii) between the time when the RTCP SR packet is received (point F) and the time when the rate change report packet is received this time (point G), the number of received packets, and the number of loss packets in the received information storing unit 145.

Further, the transmitting device 120 transmits RTCP SR packets to the receiving device 140 on a regular basis (for example, at point A, point C and point D). For example, the RTCP SR packet transmitted at point C is received at point H. Then, the receiving device 140 transmits the extended receiver report including received information of section ii and section iii, to the transmitting device 120. That is, information before the transmission rate is changed and information after the transmission rate is changed are transmitted to the transmitting device 120.

Then, when the transmitting device 120 receives the extended receiver report, the rate controlling unit 121 calculates the rate.

(First Embodiment)

The present embodiment is applicable to various rate control algorithms. A case will be explained below where the embodiment is applied to the TFRC scheme.

As a method of improving reliability of data transfer using RTP, controlling a transmission rate according to an algorithm based on the TFRC (TCP Friendly Rate Control) scheme disclosed in RFC 3448 is proposed (see, for example, Japanese Patent Application Laid-Open No. 2004-193991). Here, a rate is controlled more precisely by incorporating the present embodiment into the TFRC scheme.

According to RFC 3448, with the TFRC scheme, the target bit rate $X_{calc}$ is the throughput of TCP expressed by following expression (1), and the rate is increased and decreased according to the AIMD scheme.

$$X_{calc} = \frac{s}{R\sqrt{\frac{2p}{3}} + t_{RTO}\sqrt{\frac{3p}{8}} \cdot p \cdot (1 + 32p^2)} \quad (1)$$

Here, R refers to the round trip time, $t_{RTO}$ refers to the time out time, p refers to the loss event rate and s refers to the packet size. If the transmission rate calculated according to the AIMD scheme is X, the transmission rate X is updated according to following expressions (2) and (3) when the extended receiver report is received.

$$X = \max(\min(X_{calc}, 2 \cdot X_{recv}'), s/64) \text{ if } p > 0 \quad (2)$$

$$X = \max(\min(2 \cdot X, 2 \cdot X_{recv}'), s/R) \text{ else if } t_{diff} \geq R \quad (3)$$

Here, $t_{diff}$ refers to the difference between a previous report receiving time and a current report receiving time. Expression (2) is applied when packet loss occurs. The reception rates $X'_{recv}$ of expressions (2) and (3) are calculated according to following expression (4).

$$X'_{recv} = W_0 \cdot X_{recv}(t) + W_1 \cdot X_{recv}(t-1) + W_2 \cdot X_{recv}(t-2) + \ldots + W_n \cdot X_{recv}(t-n) \quad (4)$$

Here, $X_{recv}(t)$ refers to the latest reception rate included in the extended receiver report, and $X_{recv}(t-n)$ refers to the oldest reception rate included in the extended receiver report. These can be calculated from the number of received packets and the time of each measurement section. Further, $W_0, W_1, W_2, \ldots,$ and $W_n$ are weights to prioritize the latest rate, and $$W_0 + W_1 + W_2 + \ldots + W_n = 1, W_0 \geq W_1 \geq W_2 \geq \ldots \geq W_n$$

holds. $W_0$ is used for the latest reception rate, and $W_n$ is used for the oldest reception rate. When two $X_{recv}$ are provided, two $W_0$ and $W_1$ are provided, and, for example, $W_0=0.8$ and $W_1=0.2$ hold. By this means, with the example of FIG. 3, the reception rates $X'_{recv}$ can be calculated in section ii and section in, and the reception rate $X'_{recv}$ which prioritizes the rate in section iii more is calculated. Although calculation has been performed using an RTCP reporting interval as one section, it is possible to more precisely control the rate according to the present embodiment.

Other operations conform to RFC 3448.

(Second Embodiment)

A case will be described below where another embodiment is applied to the TFRC scheme.

The rate control scheme which improves the above rate control scheme and utilizes matching of the transmission rate and reception rate will be explained. The reception rate included in the extended receiver report is $X_{recv}(t)$, and the transmission rate matching the reception rate $X_{recv}(t)$ is $X_{send}(t)$. The transmission rate is acquired from the transmission information storing unit 125.

The difference between the matching reception rate and transmission rate is $X_{diff}(t)$, and is calculated according to following expression (5).

$$X_{diff}(t) = X_{recv}(t) - X_{send}(t) \quad (5)$$

$X'_{diff}$ obtained by multiplying the differences with a weight and adding the differences is calculated according to following expression (6).

$$X'_{diff} = W_0 \cdot X_{diff}(t) + W_1 \cdot X_{diff}(t-1) + W_2 \cdot X_{diff}(t-2) + \ldots + W_n \cdot X_{diff}(t-n) \quad (6)$$

Further, $W_0, W_1, \ldots,$ and $W_n$ are weights to prioritize the latest rate, and $$W_0 + W_1 + W_2 + \ldots + W_n = 1, W_0 \geq W_1 \geq W_2 \geq \ldots \geq W_n$$

holds.

Next, X is calculated according to above expressions (1) to (4). In addition, $W_0, W_1, W_2, \ldots,$ and $W_n$ used in expression (6) do not need to have the same value.

Finally, X is updated according to following expression (7).

$$X = X + \gamma \cdot X'_{diff} \text{ if } X'_{diff} > 0 \quad (7)$$

Here, $\gamma$ is a coefficient which takes a value between 0 and 1. $\gamma$ changes according to fluctuation of the reception rate. For example, when fluctuation of the reception rate is greater, $\gamma$ is smaller, and, when fluctuation of the reception rate is smaller, $\gamma$ is greater. Further, X needs to be clipped such that X is greater than 0. According to the present embodiment, new X is calculated by adding a coefficient $\gamma$ to the difference sum $X'_{diff}$ of X according to expressions (1) to (4). Expression (7) is applied when $X'_{diff}$ is negative, which works such that the rate decreases and does not work such that the rate increases. For example, in sections v, vi and vii corresponding to sections D and E in which the transmission rate increases in the example of FIG. 3, packets accumulated in a previous session are suddenly transmitted, thereby increasing the amount of packets. Then, X is reduced by expression (7).

Other operations conform to RFC 3448.

Figure 4:
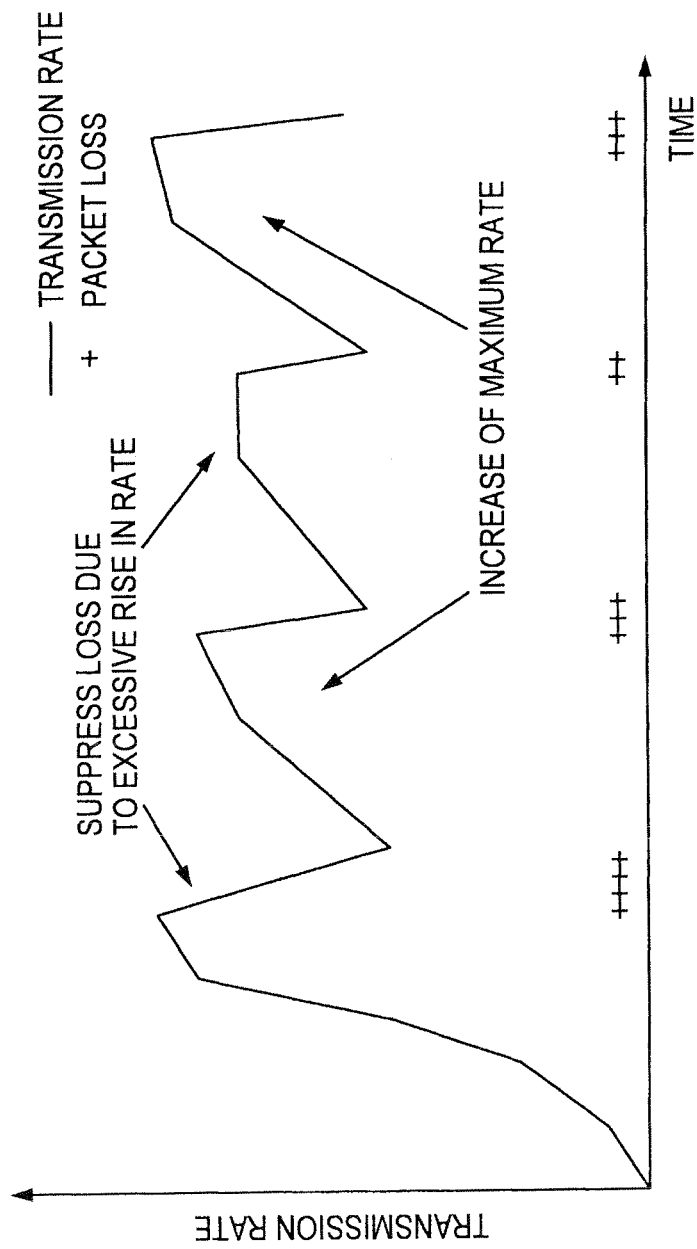
FIG. 4 is a graph showing the change of a transmission rate over time according to a first embodiment.
Figure 5:
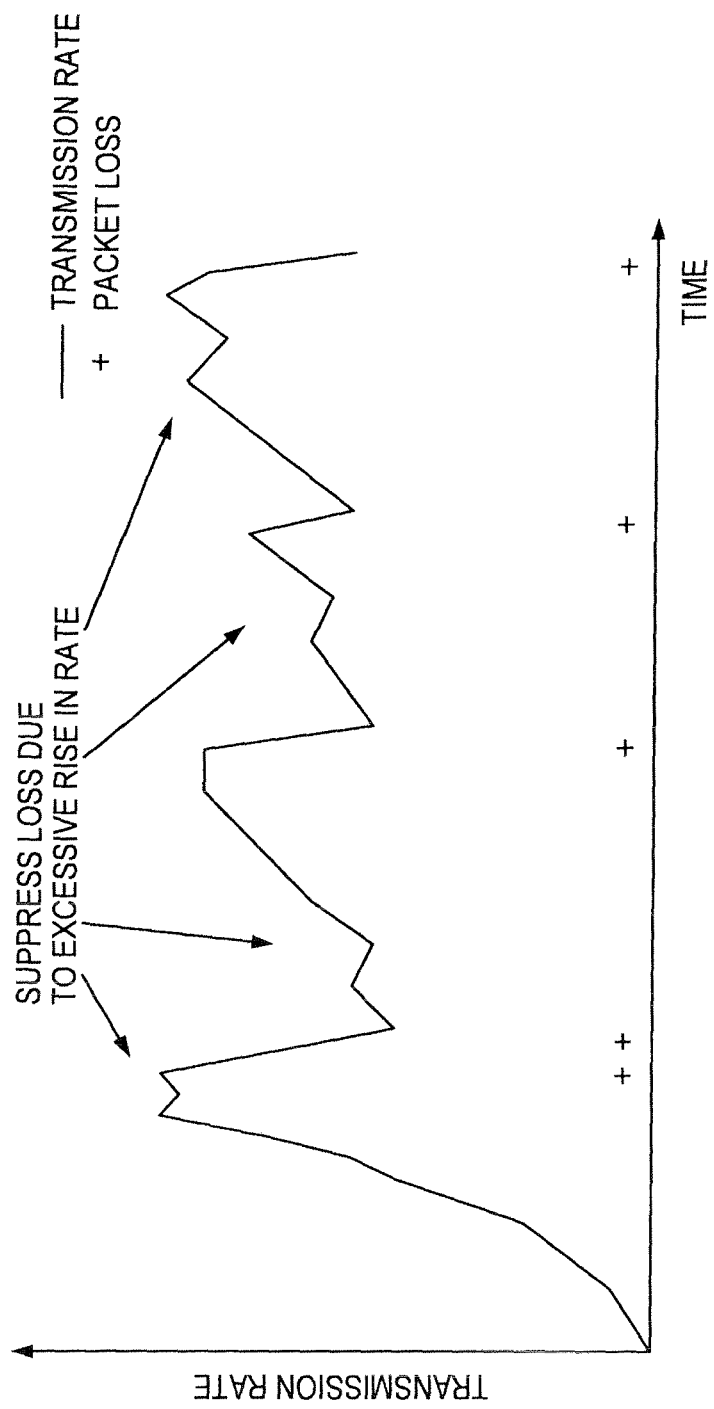
FIG. 5 is a graph showing the change of a transmission rate over time according to a second embodiment.
Figure 7:
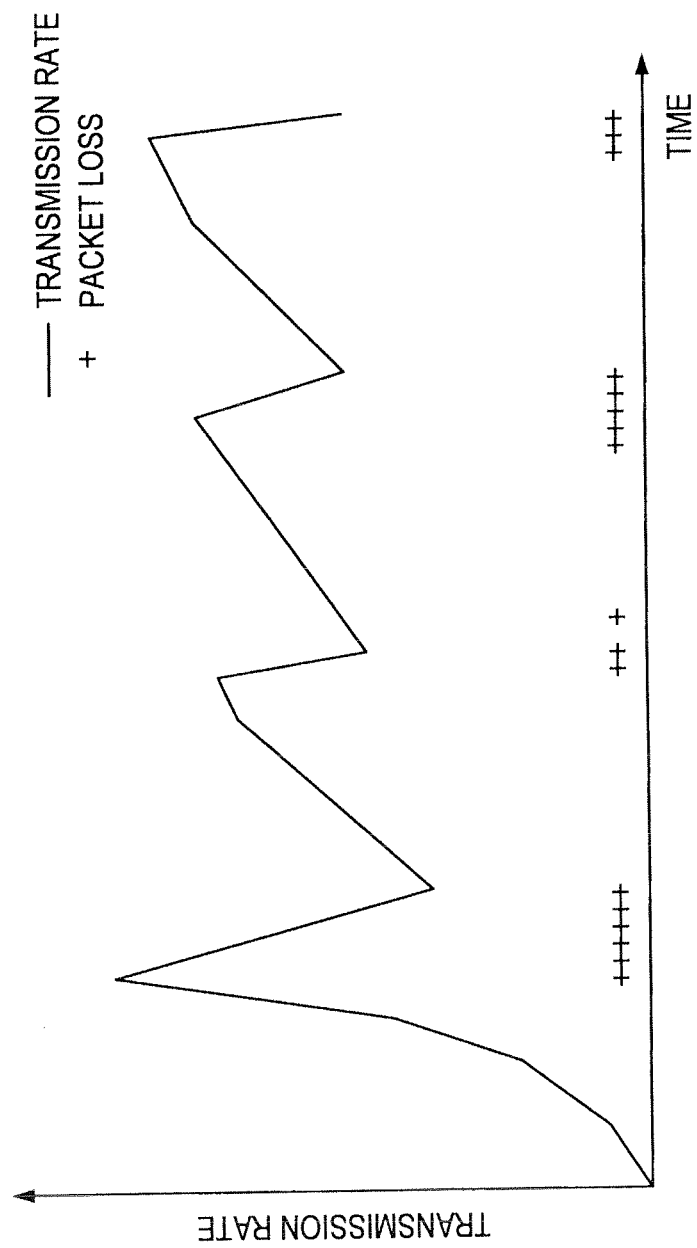
FIG. 7 is a graph showing the change of an example of rate control of TFRC over time according to a comparison example.

FIG. 4 shows the change of a transmission rate over time according to the first embodiment, and FIG. 5 shows the change of a transmission rate over time according to the second embodiment. According to both of the first embodiment and the second embodiment, when the transmission rate increases and expressions (2) and (3) apply, the transmission rate decreases, and the transmission rate repeats increasing and decreasing. According to the first embodiment and the second embodiment, it is possible to prevent packet loss due to an excessive rise in the rate. According to the second embodiment, it is possible to suppress packet loss more than the first embodiment. FIG. 7 shows an example of rate control of TFRC according to a comparison example. With the comparison example, the follow-up at the time when the transmission rate linearly rises is dull, and therefore packet loss occurs. By contrast with this, according to the first embodiment and the second embodiment, the follow-up in response to fluctuation of rate is good, so that packet loss decreases.

Figure 6:
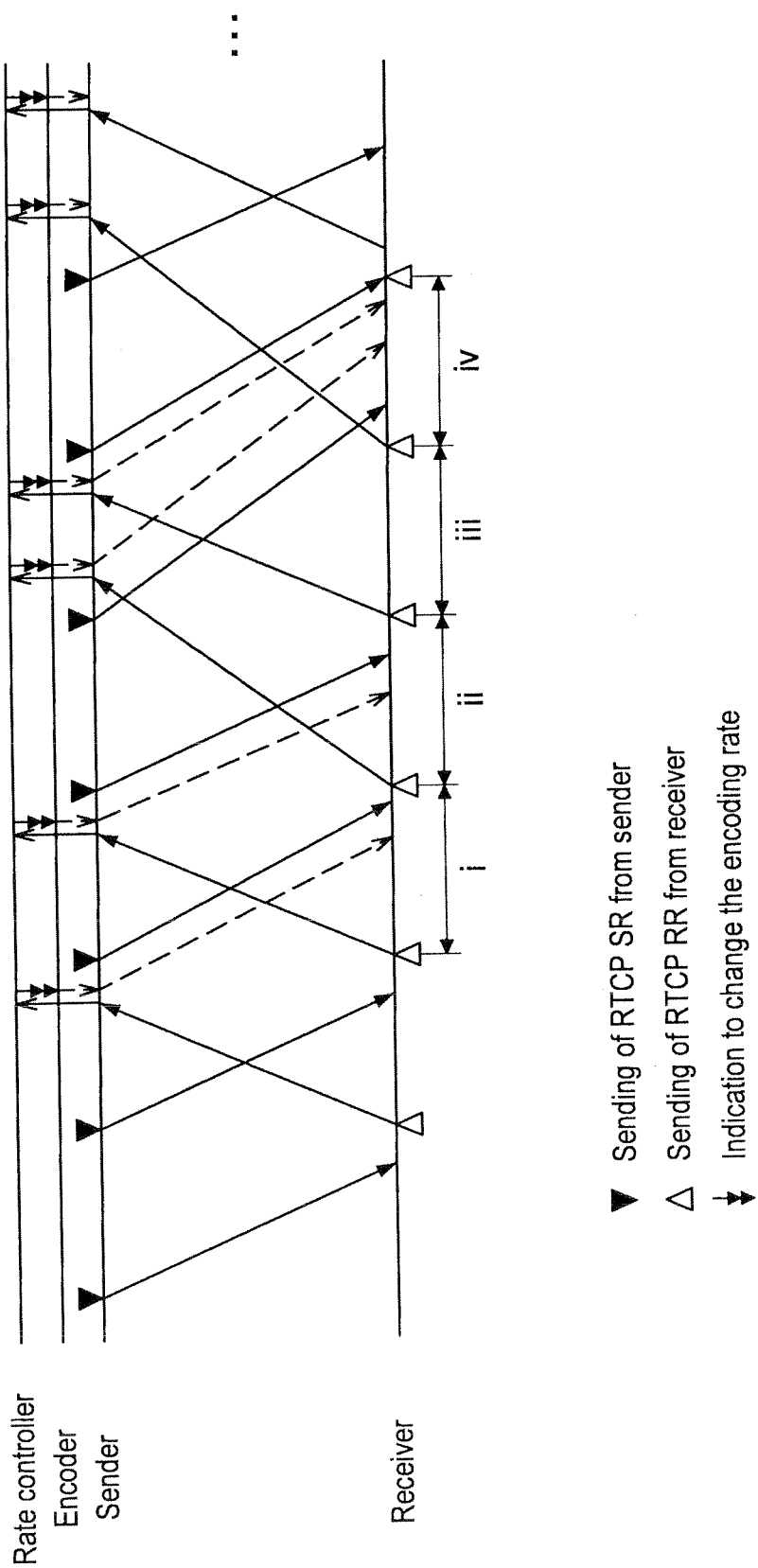
FIG. 6 is an explanatory diagram showing an example of a rate control flow according to a comparison example.

Here, the comparison example in FIG. 6 will be described. FIG. 6 shows an example where a server (transmitting device) transmits data to a client (receiving device) in a client server system, and general transmission rate control is performed using RTP and RTCP. In FIG. 6, although data transmission using RTP is not shown to prevent complication, data is transmitted from the transmitting device to the receiving device at the set transmission rate.

With this example, the transmitting device transmits a RTCP SR (Sender Report) packet to the receiving device at an RTCP reporting interval. Further, the receiving device returns an RR packet to the transmitting device at an RTCP reporting interval. To increase the accuracy of information, the RTCP reporting interval is set sufficiently short. The RR packet includes, for example, a packet interval jitter, the number of cumulative loss packets, the maximum extended sequence number, time stamp and loss packet rate.

The transmitting device which has received the RR packet calculates, for example, RTT (Round Trip Time) and reception rate. Next, these pieces of information are passed to the rate controlling unit, and the rate controlling unit calculates a new transmission rate and reports the calculated rate to the encoding unit. The encoding unit encodes video data or sound data according to the set rate. Next, the communicating unit packetizes and transmits video data to the receiving device. Then, the following issue occurs.

(1) Respective sections i to iv in FIG. 6 are intervals to return RR packets from the receiving device to the transmitting device. The transmission rate of data received by the receiving device from the transmitting device is changed by the rate controlling unit. Therefore, in the respective sections i to iv, the fed back number of received packets and the reception rate calculated from the number of loss packets are calculated based on the transmission rate before the change and the transmission rate after the change. For example, the transmission rate varies before and after the broken arrow from the transmitting device to the receiving device in FIG. 6, and therefore the reception rate is calculated in section i based on the transmission rate before the change and the transmission rate after the change. Therefore, there is an issue that the reception rate which is newly calculated may not be associated with the current transmission rate.

(2) A transmission interval of the RR packet returned by the receiving device to the transmitting device is irrespective of a timing at which the receiving device receives an SR packet from the transmitting device, and depends on the RTCP reporting interval. Therefore, there are cases where an empty time interval is produced until the receiving device transmits the RR packet after receiving the SR packet. For example, in sections i and ii, there is an empty time interval until the receiving device transmits the RR packet after receiving the SR packet. Further, in section iii, the receiving device has not received the SR packet. As a result, there is an issue that freshness of information decreases.

To sum the above up, with the present embodiment, congestion control is performed end-to-end in a network of a packet exchange system, and video images and sounds are transmitted by streaming in real time. By returning a feedback packet from the receiving device to the transmitting device, the transmitting device estimates a network band and adjusts the transmission rate by dynamically changing the encoding rate of video images and sounds. By means of the mechanism of feeding back a change timing of the transmission rate to the receiving device, an accurate reception rate for this transmission rate is acquired. The transmitting device records the change of the transmission rate for a certain number of times, and controls the rate by cross-checking the transmission rate with a corresponding reception rate.

According to the present embodiment, the transmitting device 120 can acquire an accurate reception rate matching a transmission rate in the past, so that it is possible to more precisely control the rate. Further, received information is fed back more quickly than standard RTCP in the past, so that it is possible to acquire more fresh information.

Further, precision to control the rate increases, so that it is possible not only to effectively utilize a communication band, but also to reduce packet loss and, consequently, transmit, for example, more quality video images and sounds.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-132322 filed in the Japan Patent Office on Jun. 9, 2010, the entire content of which is hereby incorporated by reference.

What is claimed is:

1. A communication processing device comprising:
one or more processors operable to:
transmit to a client, a rate change report comprising transmission information of transmission data when a transmission rate of the transmission data for the client is changed;
store the transmission information of the transmission data in a storage unit when the transmission rate is changed;
transmit to the client, a sender report comprising the transmission information of the transmission data on a regular basis separately from the rate change report;
receive from the client, an extended receiver report comprising the transmission information, wherein the extended receiver report is transmitted from the client in response to the client receiving the sender report; and
control the transmission rate of the transmission data for the client, based on the transmission information stored in the storage unit and the transmission information in the extended receiver report received from the client.

2. The communication processing device according to claim 1, wherein the transmission information comprises a transmission time and the transmission rate of the transmission data.

3. The communication processing device according to claim 1, wherein the one or more processors are operable to store the transmission information of the transmission data each time the transmission rate is changed, and control the transmission rate by comparing the transmission information stored each time and the transmission information in the extended receiver report received from the client.

4. The communication processing device according to claim 1, wherein the rate change report comprises a flag indicating a change of the transmission rate.

5. The communication processing device according to claim 1, wherein the sender report is transmitted to the client at real-time transport protocol (RTCP) time intervals.

6. The communication processing device according to claim 1, wherein the transmitting of the rate change report to the client and storing of the transmission information of the transmission data occurs simultaneously.

7. A communication processing system comprising:
a client comprising:
one or more first set of processors operable to:
receive a sender report comprising transmission information of transmission data; and
transmit an extended receiver report comprising the transmission information, in response to receiving the sender report; and
a communication processing device comprising:
one or more second set of processors operable to:
transmit to the client, a rate change report comprising the transmission information of the transmission data, separately from the sender report;
store the transmission information of the transmission data in a storage unit when the transmission rate is changed;
transmit the sender report to the client on a regular basis;
receive the extended receiver report from the client; and
control a transmission rate of transmission data for the client, based on the transmission information stored in the communication processing device and the transmission information in the extended receiver report received from the client.

8. The communication processing system according to claim 7, wherein the client stores one or more of: a transmission time, a time duration between reception of a previous rate change report and present time, a number of received packets, and a number of received packets after receiving the sender report from the communication processing device.

9. The communication processing system according to claim 7, wherein the extended receiver report comprises information before the transmission rate is changed and after the transmission rate is changed.

10. The communication processing system according to claim 7, wherein the communication processing device controls the transmission rate by dynamically changing an encoding rate of one or more of: videos, images, or audio in the transmission data.

11. A communication processing method comprising:
- when a transmission rate of transmission data for a client is changed, transmitting to the client, a rate change report comprising transmission information of the transmission data;
- when the transmission rate is changed, storing the transmission information of the transmission data in a storage unit;
- transmitting to the client, a sender report comprising the transmission information of the transmission data on a regular basis separately from the rate change report;
- receiving from the client, an extended receiver report comprising the transmission information, wherein the extended receiver report is transmitted from the client in response to the client receiving the sender report; and
- controlling the transmission rate of the transmission data for the client, based on the transmission information stored in the storage unit and the transmission information in the extended receiver report received from the client.

12. A non-transitory computer readable storage medium having stored thereon, a computer program having at least one code section executable by a computer, thereby causing the computer to perform the steps comprising:
- when a transmission rate of transmission data for a client is changed, transmitting to the client, a rate change report comprising transmission information of the transmission data;
- when the transmission rate is changed, storing the transmission information of the transmission data in a storage unit;
- transmitting to the client, a sender report comprising the transmission information of the transmission data on a regular basis separately from the rate change report;
- receiving from the client, an extended receiver report comprising the transmission information, wherein the extended receiver report is transmitted from the client in response to the client receiving the sender report; and
- controlling the transmission rate of the transmission data for the client, based on the transmission information stored in the storage unit and the transmission information in the extended receiver report received from the client.

* * * * *